(12) United States Patent
Hayata et al.

(10) Patent No.: US 8,410,214 B2
(45) Date of Patent: Apr. 2, 2013

(54) THERMOPLASTIC RESIN COMPOSITION AND MOLDED PRODUCT

(75) Inventors: Yusuke Hayata, Chiba (JP); Akio Nodera, Chiba (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 797 days.

(21) Appl. No.: 11/814,034

(22) PCT Filed: Dec. 27, 2005

(86) PCT No.: PCT/JP2005/023870
§ 371 (c)(1),
(2), (4) Date: Jul. 16, 2007

(87) PCT Pub. No.: WO2006/077721
PCT Pub. Date: Jul. 27, 2006

(65) Prior Publication Data
US 2008/0051508 A1    Feb. 28, 2008

(30) Foreign Application Priority Data
Jan. 18, 2005   (JP) ................................. 2005-010282

(51) Int. Cl.
C08L 69/00 (2006.01)
C08L 67/04 (2006.01)
C08L 51/04 (2006.01)

(52) U.S. Cl. ............... 525/66; 525/67; 525/71; 525/92 A

(58) Field of Classification Search .................... 525/66, 525/67, 92 A, 71
See application file for complete search history.

(56) References Cited

U.S. PATENT DOCUMENTS

| | | | |
|---|---|---|---|
| 6,333,381 B1 * | 12/2001 | Asada et al. .................... 525/71 |
| 6,492,467 B1 * | 12/2002 | Kim et al. ..................... 525/316 |
| 6,579,937 B1 * | 6/2003 | Guntherberg et al. .......... 525/67 |
| 6,855,786 B2 * | 2/2005 | Oh et al. ........................ 526/201 |
| 7,132,474 B2 * | 11/2006 | Seo et al. ........................ 525/53 |
| 2002/0052447 A1 * | 5/2002 | Asada et al. .................... 525/232 |
| 2003/0173546 A1 * | 9/2003 | Hiroshi et al. .................. 252/500 |
| 2004/0030044 A1 * | 2/2004 | Okamoto et al. ................ 525/63 |
| 2007/0197740 A1 | 8/2007 | Hayata et al. |

FOREIGN PATENT DOCUMENTS

| | | |
|---|---|---|
| JP | 07 109413 | 4/1995 |
| JP | 08 259789 | 10/1996 |
| JP | 09 176480 | 7/1997 |
| JP | 11 140292 | 5/1999 |
| JP | 11 279380 | 10/1999 |
| JP | 2002 114899 | 4/2002 |
| JP | 2002 220527 | 8/2002 |
| JP | 2005 008671 | 1/2005 |
| JP | 2005 048066 | 2/2005 |
| JP | 2005 048067 | 2/2005 |
| JP | 2006 028299 | 2/2006 |

OTHER PUBLICATIONS

Arai, electronic translation of specification of JP 11-279380, Oct. 1999.*
Takashima et al. electronic translation of translation of JP2005-048066 (Feb. 2005).*
Takashima, partial electronic translation of specification of JP2005-048067, Jul. 2003.*

* cited by examiner

*Primary Examiner* — Jeffrey Mullis
(74) *Attorney, Agent, or Firm* — Oblon, Spivak, McClelland, Maier & Neustadt, L.L.P.

(57) ABSTRACT

The present invention provides a thermoplastic resin composition comprising 100 mass parts of a polycarbonate resin composition comprising 50 to 95 mass % of (A) a polycarbonate resin and 50 to 5 mass % of (B) a polylactic acid based resin and 5 to 65 mass parts of (C) a vinyl based graft copolymer. The above thermoplastic resin composition comprising the polycarbonate resin and the lactic acid based resin and endowed with a mechanical characteristic of polycarbonate and an excellent fluidity of polylactic acid in combination is improved in a hydrolysis resistance and provides a molded article further improved in an impact resistance and a thin-walled falling weight impact strength. A rise in the above characteristics makes it possible to use the plastic molded articles over a long period of time, and not only the thin-walled molding property and the portability are improved, but also the thermoplastic resin composition of the present invention can industrially advantageously be used as well for large-sized molded articles. In the thermoplastic resin composition of the present invention, use of the polycarbonate-polyorganosiloxane copolymer as the polycarbonate resin component makes it possible to improve as well the flame retardancy and advantageously use the thermoplastic resin composition of the present invention for office automation equipments, information and communication equipments, car parts, building components, home electric appliances and the like.

16 Claims, No Drawings

THERMOPLASTIC RESIN COMPOSITION AND MOLDED PRODUCT

This application is a 371 of PCT/JP05/23870, filed Dec. 27, 2005.

BACKGROUND OF THE INVENTION

The present invention relates to a thermoplastic resin composition which is excellent in a mechanical strength a moisture resistance and a fluidity and a molded article. More specifically, the present invention relates to a resin composition comprising a polycarbonate resin and a lactic acid based resin which is improved in a hydrolysis resistance to a large extent and excellent in a mechanical strength such as a thin-walled falling weight impact strength and an Izod impact strength and a molded article comprising the above resin composition. The thermoplastic resin composition of the present invention can be used in the electric and electronic field such as office automation equipments, information and communication equipments home electric appliances and the like, the automobile field, the construction field and the like.

RELATED ART

A polycarbonate resin is excellent in mechanical characteristics such as an impact resistance and the like, a heat resistance and a transparency, and therefore it is used in the various fields. A reduction in the cost, a molding workability of the polycarbonate resin, a thickness dependency in the impact resistance and the like are improved by mixing the polycarbonate resin with other resins, for example, an ABS resin, and it is used in the various fields such as housings of electronic communication equipments car interior parts and the like. However, in the case of a polycarbonate/ABS resin composition, a polycarbonate composition having a higher fluidity is required to be developed in order to meet an enlargement in a size and a reduction in a thickness which are trends in recent years.

In recent years, polylactic acid which is a resin originating plants attracts attentions very much in electric communication equipments and materials for automobiles. This polylactic acid is produced from sweat corn and sugar cane and reduces environmental load from the viewpoint that it is finally decomposed into water and carbon dioxide (carbon neutral) and therefore development thereof is advanced as a resin mild to the environment.

Addition of polylactic acid to polycarbonate improves a fluidity to a large extent. However, the heat resistance, the impact resistance and the transparency are reduced to a large extent. The heat resistance is improved by adding an inorganic filler, a plant fiber and a basic substance. It is known that the impact resistance can be enhanced by addition of an elastomer and accelerating compatibility of polycarbonate with polylactic acid.

Both of polycarbonate and polylactic acid are hygroscopic resins and therefore bring about hydrolysis when used for a long period of time, so that they are limited in the usable fields.

In the case of using a hydrolysis inhibitor for a polylactic acid resin composition, it is known to add carbodiimide to a mixture of a specific cyclic compound with polyester which can have a crystal structure of polylactic acid and the like (refer to, for example, a patent document 1).

An aromatic polycarbonate/polylactic acid alloy is known as a pearlescent resin composition (refer to, for example, a patent document 2). However, the patent document 2 does not refer to a hydrolytic property of the polycarbonate/polylactic acid alloy, and the impact resistance is preferably further improved.

Patent document 1: Japanese Patent Application Laid-Open No. 327803/2003 (claim 13)
Patent document 2: Japanese Patent Application Laid-Open No. 109413/1995

DISCLOSURE OF THE INVENTION

The present invention has been made in light of the situation described above, and an object thereof is to provide a thermoplastic resin composition comprising a polycarbonate resin and a lactic acid based resin and endowed with a mechanical characteristic of polycarbonate and an excellent fluidity of polylactic acid in combination which is improved in a hydrolysis resistance and which provides a molded article further improved in an impact resistance and a thin-walled falling weight impact strength.

Intensive investigations repeated by the present inventors in order to solve the problems described above have resulted in finding that addition of a vinyl based graft copolymer to a resin composition comprising a polycarbonate resin and a lactic acid based resin enhances a hydrolysis resistance as well as an impact strength and enhances as well a thin-walled falling weight impact strength and that combined use of polycarbonate with a polycarbonate-polyorganosiloxane copolymer can improve as well a flame retardancy. The present invention has been completed based on the above knowledge.

That is, the present invention provides the following thermoplastic resin composition and molded article.

1. A thermoplastic resin composition comprising 100 mass parts of a polycarbonate resin composition comprising 50 to 95 mass % of (A) a polycarbonate resin and 50 to 5 mass % of (B) a polylactic acid based resin and 5 to 65 mass parts of (C) a vinyl based graft copolymer.
2. The thermoplastic resin composition as described in the above item 1, wherein the vinyl based graft copolymer (C) is at least one selected from acrylonitrile-butadiene-styrene copolymers (ABS resins) methyl methacrylate-butadiene-styrene copolymers (MBS resins), acrylonitrile-acryl rubber-styrene copolymers (AAS resins) and acrylonitrile-(ethylene.propylene.diene rubber)-styrene copolymers (AES resins).
3. The thermoplastic resin composition as described in the above item 1 or 2, wherein the polycarbonate resin (A) has a viscosity average molecular weight of 14,000 to 40,000
4. The thermoplastic resin composition as described in any of the above items 1 to 3, wherein the polycarbonate resin (A) is a polycarbonate-polyorganosiloxane copolymer or a polycarbonate resin comprising a polycarbonate-polyorganosiloxane copolymer.
5. A molded article comprising the thermoplastic resin composition as described in any of the above items 1 to 4.
6. The molded article as described in the above item 5, wherein it is used for any of office automation equipments, information and communication equipments, car parts, building components and home electric appliances.

BEST MODE FOR CARRYING OUT THE INVENTION

In the thermoplastic resin composition of the present invention, the polycarbonate resin of the component (A) shall not specifically be restricted and includes various resins, and it is suitably a polymer having a repetitive unit of a structure represented by Formula (1):

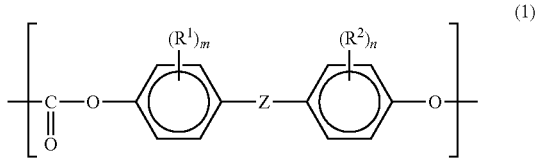

In Formula (1) described above, $R^1$ and $R^2$ each are a halogen atom (for example chlorine, fluorine, bromine and iodine) or an alkyl group having 1 to 8 carbon atoms (for example, methyl, ethyl, propyl, isopropyl, various butyls (n-butyl, isobutyl, sec-butyl and tert-butyl), various pentyls, various hexyls, various heptyls and various octyls).

The terms m and n each are an integer of 0 to 4. When m is 2 to 4, $R^1$ may be the same as or different from each other, and when n is 2 to 4, $R^2$ may be the same as or different from each other.

Z represents an alkylene group having 1 to 8 carbon atoms or an alkylidene group having 2 to 8 carbon atoms (for example, methylene, ethylene, propylene, butylene, pentylene, hexylene, ethylidene, isopropylidene and the like), a cycloalkylene group having 5 to 15 carbon atoms or a cycloalkylidene group having 5 to 15 carbon atoms (for example, cyclopentylene, cyclohexylene, cyclopentylidene, cyclohexylidene and the like), a single bond, a —SO$_2$—, —SO—, —S—, —O— or —CO— bond or a bond represented by the following Formula (2) or Formula (2'):

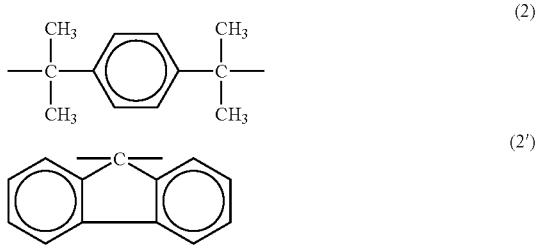

The polymer described above can readily be produced usually by reacting divalent phenol represented by Formula (3):

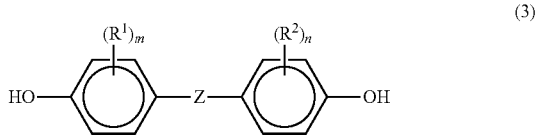

[wherein $R^1$, $R^2$ m and n are the same as in Formula (1)] with a carbonate precursor such as phosgene.

That is, the polymer can readily be produced by reacting divalent phenol with a carbonate precursor such as phosgene in a solvent such as methylene chloride under the presence of a publicly known acid acceptor and molecular weight controller. Further, it can be produced as well by transesterification of divalent phenol with a carbonate precursor such as a carbonic ester compound.

Various compounds can be given as the divalent phenol represented by Formula (3). In particular, 2,2-bis(4-hydroxyphenyl)propane (commonly called bisphenol A) is preferred.

Divalent phenols other than bisphenol A include, for example, bis(4-hydroxyphenyl)alkanes such as bis(4-hydroxyphenyl)methane, 1,1-bis(4-hydroxyphenyl)ethane and 1,2-bis(4-hydroxyphenyl)ethane, bis(4-hydroxyphenyl)cycloalkanes such as 1,1-bis(4-hydroxyphenyl)cyclohexane and 1,1-bis(4-hydroxyphenyl)cyclodecane, 4,4'-dihydroxydiphenyl, bis(4-hydroxyphenyl) oxide, bis(4-hydroxyphenyl) sulfide bis(4-hydroxyphenyl) sulfone, bis(4-hydroxyphenyl) sulfoxide, bis(4-hydroxyphenyl) ketone and the like.

In addition thereto, the divalent phenols include hydroquinone.

The above divalent phenols may be used alone or in a mixture of two or more kinds thereof.

The carbonic ester compound includes, for example, diaryl carbonates such as diphenyl carbonate and dialkyl carbonates such as dimethyl carbonate and diethyl carbonate.

The polycarbonate resin may be a homopolymer prepared by using one of the divalent phenols described above or may be a copolymer prepared by using two or more kinds thereof.

Further, it may be a thermoplastic random branched polycarbonate resin obtained by using a multifunctional aromatic compound in combination with the divalent phenol described above.

The multifunctional aromatic compound is usually called a branching agent and includes, to be specific, 1,1,1-tris(4-hydroxyphenyl)ethane, α,α',α"-tris (4-hydroxyphenyl)-1,3,5-triisopropylbenzene, 1-[α-methyl-α-(4'-hydroxyphenyl)ethyl]-4-[α',α'-bis (4"-hydroxyphenyl)ethyl]benzene, fluoroglucine, trimellitic acid, isatinbis(o-cresol, and the like.

The polycarbonate resins having the above characteristics are commercially available, for example, in the form of an aromatic polycarbonate resin such as Tarflon FN3000A, FN2500A, FN2200A, FN1900A, FN1700A and FN1500A (trade names, manufactured by Idemitsu Kosan Co., Ltd.).

The polycarbonate resin used in the present invention includes, in addition to the homopolymers produced by using only the divalent phenols described above, polycarbonate-polyorganosiloxane copolymers (hereinafter abbreviated as PC-POS copolymers) or polycarbonate resins comprising the PC-POS copolymers, and they are preferred since not only an impact resistance is raised but also a flame retardancy is improved. The polycarbonate resin used in the present invention is more preferably the PC-POS copolymer alone from the viewpoint of a flame retardancy and an impact resistance.

The PC-POS copolymer includes various copolymers and is preferably a copolymer comprising a polycarbonate part having a repetitive unit of a structure represented by the following Formula (1):

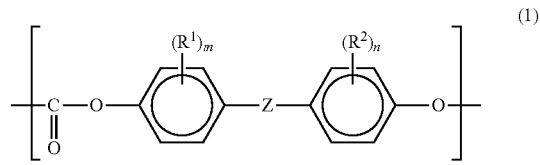

[wherein $R^1$, $R^2$, Z, m and n are the same as described above] and a polyorganosiloxane part having a repetitive unit of a structure represented by the following Formula (4):

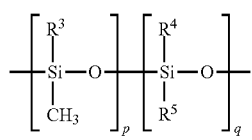

(4)

[wherein $R^3$, $R^4$ and $R^5$ each are a hydrogen atom, an alkyl group having 1 to 5 carbon atoms (for example, methyl, ethyl, propyl, n-butyl, isobutyl and the like) or a phenyl group; p and a each are an integer of 0 or 1 or more, and the total of p and q is an integer of 1 or more].

In this regard, a polymerization degree of the polycarbonate part is preferably 3 to 100, and a polymerization degree of the polyorganosiloxane part is preferably 2 to 500.

The PC-POS copolymer described above is a block copolymer comprising the polycarbonate part having the repetitive unit of the structure represented by Formula (1) described above and the polyorganosiloxane part having the repetitive unit of the structure represented by Formula (4) described above.

The above PC-POS copolymer can be produced by dissolving a polycarbonate oligomer (hereinafter abbreviated as a PC oligomer) constituting the polycarbonate part which is produced in advance and polyorganosiloxane having a reactive group at an end (for example, polydialkylsiloxane such as polydimethylsiloxane (PDMS) and polydiethylsiloxane and polymethylphenylsiloxane) constituting the polyorganosiloxane part in a solvent such as methylene chloride, chlorobenzene and chloroform adding thereto a sodium hydroxide aqueous solution of bisphenol and subjecting them to interfacial polycondensation reaction using triethylamine or trimethylbenzylammonium chloride as a catalyst.

Further, PC-POS copolymers produced by a method described in Japanese Patent Publication No. 30105/1969 and a method described in Japanese Patent Publication No. 20510/1970 can be used as well.

In this connection, the PC oligomer having the repetitive unit represented by Formula (1) can readily be produced by a solvent methods that is, reacting the divalent phenol represented by Formula (3) described above with a carbonate precursor such as phosgene or a carbonic ester compound in a solvent such as methylene chloride under the presence of a publicly known acid acceptor and molecular weight controller.

For example, it can be produced by reacting the divalent phenol with the carbonate precursor such as phosgene or by transesterification of the divalent phenol with the carbonate precursor such as a carbonic ester compound in a solvent such as methylene chloride under the presence of a publicly known acid acceptor and molecular weight controller.

The same compounds as described above can be used as the carbonic ester compound, and the same compounds as end terminating agents described later can be used as the molecular weight controller.

In the present invention, the PC oligomer used for producing the PC-POS copolymer may be a homopolymer prepared by using one of the divalent phenols described above or a copolymer prepared by using two or more kinds thereof.

Further, it may be a thermoplastic random branched polycarbonate resin obtained by using a multifunctional aromatic compound in combination with the divalent phenol described above.

Further, the polycarbonate resin used in the present invention is suitably as well a polycarbonate resin having an end group represented by the following Formula (5):

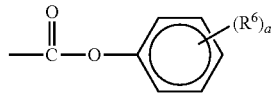

(5)

[wherein, $R^6$ represents an alkyl group having 1 to 35 carbon atoms, and a term a represents an integer of 0 to 5].

In Formula (5), $R^6$ is an alkyl group having 1 to 35 carbon atoms and may be linear or branched.

The bonding position may be any of a para position, a meta position and an ortho position, and the para position is preferred.

The polycarbonate resin having the end group represented by Formula (5) can readily be produced by reacting divalent phenol with phosgene or a carbonic ester compound.

For example, the above polycarbonate resin can be produced by reacting divalent phenol with a carbonate precursor such as phosgene or by transesterification of divalent phenol with a carbonate precursor such as diphenyl carbonate in a solvent such as methylene chloride under the presence of a catalyst such as triethylamine and a specific end terminating agent.

In this connection, the divalent phenol may be the same as or different from the compound represented by Formula (3) described above.

The polycarbonate resin may be a homopolymer prepared by using one of the divalent phenols described above or a copolymer prepared by using two or more kinds thereof.

Further, it may be a thermoplastic random branched polycarbonate resin obtained by using a multifunctional aromatic compound in combination with the divalent phenol described above.

The carbonic ester compound includes diaryl carbonates such as diphenyl carbonate and dialkyl carbonates such as dimethyl carbonate and diethyl carbonate each described above.

Phenol compounds by which the end group represented by Formula (5) described above is formed may be used as the end terminating agent. That is, they are phenol compounds represented by the following Formula (6):

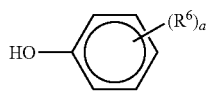

(6)

[wherein, $R^6$ represents an alkyl group having 1 to 35 carbon atoms, and a term a represents an integer of 0 to 5].

The above alkylphenols include phenol, p-cresol, p-tert-butylphenol, p-tert-octylphenol, p-cumylphenol, p-nonylphenol, docosylphenol, tetracosylphenol, hexacosylphenol, octacosylphenol, triacontylphenol, dotriacontylphenol, tetratriacontylphenol and the like. They may be used alone or in a mixture of two or more kinds thereof.

The above alkylphenols may be used in combination with other phenol compounds and the like as long as the effects are not damaged.

The polycarbonate resin produced by the method described above has substantially the end group represented by Formula (5) at one end or both ends of a molecule.

The polycarbonate resin used as the above component (A) has usually a viscosity average molecular weight of 14,000 to 40,000. If the above viscosity average molecular weight is 14,000 or more, the thermoplastic resin composition obtained is satisfactory in a heat resistance and mechanical properties, and if the above viscosity average molecular weight is 40,000 or less, the thermoplastic resin composition obtained is improved in a molding workability.

The above polycarbonate resin has a viscosity average molecular weight of preferably 14,000 to 30,000, more preferably 17,000 to 22,000 in terms of a balance in the mechanical properties.

The viscosity average molecular weight (Mv) is a value obtained by measuring a viscosity of the methylene chloride solution at 20° C. by means of a Ubbelohde viscometer, determining the limiting viscosity [η] from the above viscosity and calculating from an equation of $$[\eta]=1.23\times10^{-5}Mv^{0.83}.$$

In the thermoplastic resin composition of the present invention, the polylactic acid based resin of the component (B) includes polylactic acid and copolymers of lactic acids with other hydroxycarboxylic acids. Polylactic acid is usually synthesized from a cyclic dimer of lactic acid which is called lactide by ring-opening polymerization, and the production processes thereof are disclosed in U.S. Pat. Nos. 1,955,970, 2,362,511, 2,683,136 and the like.

The copolymers of lactic acid with the other hydroxycarboxylic acids are usually synthesized from lactide and cyclic ester intermediates of hydroxycarboxylic acids by ring-opening polymerization, and the production processes thereof are disclosed in U.S. Pat. Nos. 3,635,956, 3,797,499 and the like.

When the polylactic acid based resin is produced by direct dehydration polycondensation without depending on ring-opening polymerization, lactic acids and if necessary other hydroxycarboxylic acids are polymerized by a method in which they are subjected to azeotropic dehydration condensation under the presence of preferably an organic solvent, particularly, a phenyl ether based solvent and in which particularly preferably the solvent turned into a substantially anhydrous state by removing water from the solvent distilled out by azeotropy is returned to the reaction system, whereby the polylactic acid based resin having a polymerization degree suited to the present invention is obtained.

All of L- and D-lactic acids or a mixture thereof and lactide which is a dimer of lactic acid can be used as the lactic acids of the raw material.

The other hydroxycarboxylic acids which can be used in combination with the lactic acids include glycolic acid, 3-hydroxybutyric acid, 4-hydroxybutyric acid, 4-hydroxyvaleric acid, 5-hydroxyvaleric acid and 6-hydroxycaproic acid, and capable of being used as well are cyclic ester intermediates of hydroxycarboxylic acids, for example, glycolide which is a dimes of glycolic acid and ε-caprolactone which is a cyclic ester of 6-hydroxycaproic acid.

In producing the polylactic acid based resins a suitable molecular weight controller, a branching agent, other modifying agents and the like can be blended as well.

Both of the lactic acids and the other hydroxycarboxylic acids as the copolymer component can be used in a single kind or two or more kinds, and the polylactic acid based resins obtained may be used in a mixture of two or more kinds thereof.

In the present invention, polylactic acid which is a polymer comprising only lactic acids is suitably used, and particularly a poly-L-lactic acid resin is preferred.

The polylactic acid based resin of the component (B) used in the present invention is preferably a resin having a large molecular weight from the viewpoint of thermal properties and mechanical properties, and it is preferably a resin having a weight average molecular weight of 30,000 or more.

A content proportion of the polycarbonate resin of the component (A) to the polylactic acid based resin of the component (B) in the present invention falls in a range of 50:50 to 95:5, preferably 60:40 to 80:20 in terms of a mass ratio.

If a content proportion of the component (A) to the component (B) falls in the range described above, the thermoplastic resin composition of the present invention is excellent in a mechanical strength, a thermal stability and a molding stability, and a vinyl based graft copolymer which is a component (C) described later is improved in a dispersibility.

In the thermoplastic resin composition of the present invention, the vinyl based graft copolymer of the component (C) comprises preferably, to be specific a graft copolymer (C-1) prepared by copolymerizing at least one monomer selected from an aromatic vinyl based monomer (b), a vinyl cyanide based monomer (c) and a different vinyl based monomer (d) copolymerizable with the above monomers under the presence of a gum polymer (e) and a vinyl based polymer (C-2) comprising at least one monomer selected from the aromatic vinyl based monomer (b), the vinyl cyanide based monomer (c) and the different vinyl based monomer (d) with the above monomers.

The gum polymer (e) used for the graft copolymer (C-1) shall not specifically be restricted and is suitably a polymer having a glass transition temperature of 0° C. or lower, and diene based rubbers acryl based rubber, ethylene based rubber and the like can be used. The specific examples of the gum polymer include polybutadiene, styrene-butadiene copolymers, styrene-butadiene block copolymers, acrylonitrile-butadiene copolymers, butyl acrylate-butadiene copolymers, polyisoprene, butadiene-methyl methacrylate copolymers, butyl acrylate-methyl methacrylate copolymers, butadiene-ethyl acrylate copolymers, ethylene-propylene copolymers, ethylene-propylene-diene based copolymers, ethylene-isoprene copolymers and ethylene-methyl acrylate copolymers. Among the above gum polymers, polybutadiene, styrene-butadiene copolymers, styrene-butadiene block copolymers and acrylonitrile-butadiene copolymers are preferably used from the viewpoint of an impact resistance.

A weight average particle diameter of the gum polymer (e) constituting the graft copolymer (C-1) shall not specifically be restricted, and it falls in a range of preferably 0.2 to 1 μm, more preferably 0.1 to 2 μm from the viewpoint of an impact strength.

The above gum polymers (e) can be used alone or in a mixture of two or more kinds thereof.

The aromatic vinyl based monomer (b) used for the graft copolymer (C-1) and the vinyl based polymer (C-2) shall not specifically be restricted and includes α-methylstyrene, vinyltoluene, o-ethylstyrene, p-t-butylstyrene and the like, and styrene is particularly preferred. They can be used alone or in a mixture of two or more kinds thereof.

The vinyl cyanide based monomer (c) used for the graft copolymer (C-1) and the vinyl based polymer (C-2) shall not specifically be restricted and includes acrylonitrile, methacrylonitrile and ethacrylonitrile, and among them, acrylonitrile is most preferably used. They can be used alone or in a mixture of two or more kinds thereof.

The different copolymerizable vinyl based monomer (d) used for the graft copolymer (C-1) and the vinyl based polymer (C-2) shall not specifically be restricted as long as it is copolymerizable with the aromatic vinyl based monomer (b)

and the vinyl cyanide based monomer (c), and it is suitably an unsaturated carboxylic acid alkyl ester based monomer (a). In particular, acrylic acid ester and/or methacrylic acid ester having an alkyl group having 1 to 6 carbon atoms or a substituted alkyl group are preferred. The specific examples thereof include methyl (meth)acrylate, ethyl (meth)acrylate, n-propyl (meth)acrylate, n-butyl (meth)acrylate, t-butyl (meth)acrylate, n-hexyl (meth)acrylate, cyclohexyl (meth) acrylate, chloromethyl (meth)acrylate, 2-chloroethyl (meth) acrylate, 2-hydroxyethyl (meth)acrylate, 3-hydroxypropyl (meth)acrylate, 2,3,4,5,6-pentahydroxyhexyl (meth)acrylate and 2,3,4,5-tetrahydroxypentyl (meth)acrylate, and among them, methyl methacrylate is preferred. They can be used alone or in a mixture of two or more kinds thereof.

Further, capable of being used as the different copolymerizable vinyl based monomer (d) are, if necessary, other copolymerizable monomers such as (meth)acrylic acid, glycidyl (meth acrylate, glycidyl itaconate, allyl glycidyl ether, styrene-p-glycidyl ether, p-glycidylstyrene, maleic acid, maleic anhydride, monoethyl maleate, itaconic acid, itaconic anhydride, phthalic acid, N-methylmaleimide, N-ethylmaleimide, N-cyclohexylmaleimide, N-phenylmaleimide, acrylamide, methacrylamide, N-methylacrylamide, butoxymethylacrylamide, N-propylmethacrylamide, aminoethyl acrylate, propylaminoethyl acrylate, dimethylaminoethyl methacrylate, ethylaminopropyl methacrylate, phenylaminoethyl methacrylate, cyclohexylaminoethyl methacrylate, N-vinyldiethylamine, N-acetylvinylamine, allylamine, metaallylamine, N-methylallylamine, p-aminostyrene, 2-isopropenyl-oxazoline, 2-vinyl-oxazoline, 2-acryloyl-oxazoline, 2-styryl-oxazoline and the like. They can be used alone or in a mixture of two or more kinds thereof.

The graft copolymer (C-1) is obtained by reacting at least one monomer selected from the aromatic vinyl based monomer (b), the vinyl cyanide based monomer (c) and the different vinyl based monomer (d) copolymerizable with the above monomers under the presence of 10 to 80 mass parts, preferably 20 to 70 mass parts and more preferably 30 to 60 mass parts of the gum polymer (e) used so that the total amount of the monomers and the gum polymer (e) is 100 mass parts.

The production processes of the graft copolymer (C-1) and the vinyl based copolymer (C-2) shall not specifically be restricted, and they can be obtained by a publicly known production process such as bulk polymerization, solution polymerization, suspension polymerization and emulsion polymerization.

The mixing ratios of the graft copolymer (C-1) and the vinyl based copolymer (C-2) which constitute the vinyl based graft copolymer of the component (C) are preferably 10 to 100 mass parts for the graft copolymer (C-1) and 0 to 90 mass parts for the vinyl based copolymer (C-2), more preferably 20 to 60 mass parts for the graft copolymer (C-1) and 0 to 80 mass parts for the vinyl based copolymer (C-2). If the graft copolymer (C-1) accounts for less than 10 mass parts, the vinyl based graft copolymer of the component (C) is short of an impact resistance in a certain case.

Further, a content of the gum polymer (e) contained in the vinyl based graft copolymer of the component (C) is preferably 5 to 30 mass %, more preferably 10 to 20 mass %. If the gum polymer (a) accounts for less than 5 mass %, the impact resistance is short, and if the content exceeds 30 mass %, the molding workability is damaged in a certain case. Accordingly, both are not preferred.

The specific examples of the above vinyl based graft copolymer includes for examples acrylonitrile-butadiene rubber-styrene copolymers (ABS resins), methyl methacrylate-butadiene rubber-styrene copolymers (MBS resins) acrylonitrile-acryl rubber-styrene copolymers (AAS resins) and acrylonitrile-(ethylene.propylene.diene rubber)-styrene copolymers (AES resins). ABS resins and MBS resins are preferred from the viewpoint of the effects of improving the hydrolysis resistance and the impact resistance.

An addition amount of the vinyl based graft copolymer of the component (C) is 5 to 51 mass parts preferably 10 to 30 mass parts per 100 mass parts of the polycarbonate resin composition comprising the polycarbonate resin (A) and the polylactic acid based resin (B). Setting an addition amount of the vinyl based graft copolymer to 5 mass parts or more provides the high hydrolysis resistance and improves the impact resistance and the thin-walled falling weight impact strength. However, the addition amount exceeding 65 mass parts results in obtaining no effect of the falling weight impact strength.

The thermoplastic resin composition of the present invention can be obtained by blending the component (A), the component (B) and the component (C) each described above and, if necessary, other components and melting and kneading them.

Blending and kneading described above can be carried out by a method usually used, for example, a method using a ribbon blender, a Henschel mixer, a Banbury mixer, a drum tumbler, a single screw extruding machine, a double screw extruding machine, a cokneader, a multiscrew extruding machine and the like.

The heating temperature in melting and kneading is selected in a range of usually 220 to 260° C.

The present invention provides as well a molded article comprising the thermoplastic resin composition described above. A molding temperature of the thermoplastic resin composition of the present invention is selected as well in a range of usually 220 to 260° C.

The thermoplastic resin composition of the present invention has both of a mechanical characteristic of polycarbonate and an excellent fluidity of a polylactic acid based resin and makes it possible to obtain a molded article which has a hydrolysis resistance and which is improved in an impact resistance and a thin-walled falling weight impact strength. A rise in the above characteristics makes it possible to use the plastic molded articles over a long period of time, and not only the thin-walled molding property and the portability are improved, but also the thermoplastic resin composition of the present invention can industrially advantageously be used as well for large-sized molded articles. Combined use thereof with the polycarbonate-polyorganosiloxane copolymer makes it possible to enhance as well the flame retardancy and advantageously use the thermoplastic resin composition of the present invention for office automation equipments, information and communication equipments car parts, building components, home electric appliances and the like.

EXAMPLES

Next, the present invention shall be explained in further details with reference to examples, but the present invention shall by no means be restricted by these examples.

In the following examples and comparative examples, the performances were evaluated by the following methods.
(1) Moisture Resistance Holding Rate:

A 48 hour exposure test was carried out on the conditions of 110° and 100% RH, and a holding rate of elongation was measured by a tensile test (test condition: 23° C., wall thickness: 0.32 mm (⅛ inch)) based on JIS K7162.

(2) Izod Impact Strength:
Measured based on ASTM D256 (test condition: 23° C., wall thickness: 0.32 mm (⅛ inch)).
(3) Falling Weight Impact Strength (Test Piece Thickness 1 mm: Thin Wall Thickness)
(4) Falling Weight Impact Strength (Test Piece Thickness: 2 mm):
Measured at a weight of 3.76 kg and a falling speed of 5 m/second based on JIS K7211 at 23° C.
(5) Fluidity (SFL):
Measured at a molding temperature of 260° C., a die temperature of 80° C., a wall thickness of 2 mm, a width of 10 mm and an injection pressure of 7.9 MPa. (unit: cm)
(6) Flame Retardancy:
A vertical burning test was carried out at a test piece thickness of 1.5 mm on a UL94 standard according to Underwrite Laboratory Subject 94.

Examples 1 to 7 and Comparative Examples 1 to 3

The respective components (A) to (C) were blended in proportions shown in Table 1 and fed to a bent type double shaft extrusion molding machine (model name: TEM35, manufactured by Toshiba Machine Co, Ltd.), molten and kneaded at 240° C. and pelletized. Each 0.1 mass part of a phosphorus based antioxidant (trade name "Adekastab PEP-36", manufactured by Asahi Denka Co., Ltd.) and a phenol based antioxidant (trade name "Irganox 1076", manufactured by Ciba Specialty Chemicals K. K.) as stabilizers was blended in all examples and comparative examples.

Next, the pellets thus obtained were dried at 100° C. for 10 hours and then injection-molded at a molding temperature of 240° C. (die temperature 40° C.) to obtain test pieces using the resins prepared in the respective examples and comparative examples. The test pieces thus obtained were used to evaluate the respective performances by the performance evaluation methods described above.

mass %, which was prepared according to Production Example 4 described in Japanese Patent Application Laid-Open No. 12755/2002
(B) polylactic acid: H-400 (manufactured by Mitsui Chemicals Inc.)
(C)-1 ABS resin: AT-05 (manufactured by Nippon A & L Inc.)
(C)-2 MBS resin: Ecopact K-300G (manufactured by Dainippon Ink & Chemicals Inc.)
(D) Elastomer: MMA/butyl acrylate elastomer (W450A, manufactured by Mitsubishi Rayon Co., Ltd.)

The followings have become clear from Table 1.
(1) It has become clear from Examples 1 to 7 that the moisture resistance holding rate, the Izod impact strength and the thin-walled (1 mm thickness) falling weight impact strength are improved by adding the vinyl based graft copolymer (C) to the resin composition comprising the polycarbonate resin (A) and the polylactic acid based resin (B). Further, it has become clear from Examples 3 to 7 that combine use of the resin composition with the polycarbonate-polydimethylsiloxane copolymer makes it possible to enhance the flame retardancy.
(2) it has become clear from Comparative Example 1 that no addition of the vinyl based graft copolymer lowers the moisture resistance holding rate, the Izod impact strength and the thin-walled falling weight impact strength.
(3) It has become clear from Comparative Example 2 that addition of the elastomer of a core/shell type enhances the Izod impact strength but does not improve the moisture resistance holding rate and the thin-walled falling weight impact strength.
(4) It has become clear from Comparative Example 3 that when the polylactic acid resin exceeds 50 mass % the moisture resistance holding rate and the impact strength are not enhanced even by adding the vinyl based graft copolymer.

TABLE 1

| | | | Example | | | | | | | Comparative Example | | |
|---|---|---|---|---|---|---|---|---|---|---|---|---|
| | | | 1 | 2 | 3 | 4 | 5 | 6 | 7 | 1 | 2 | 3 |
| Blend rate (mass part) | (A) | (A)-1 | 90 | 70 | 50 | 30 | 40 | | | 70 | 70 | |
| | | (A)-2 | | | 30 | 30 | 30 | 60 | 90 | | | 35 |
| | (B) | Polylactic acid | 10 | 30 | 20 | 40 | 30 | 40 | 10 | 30 | 30 | 65 |
| | (C) | (C)-1 | 10 | | | 40 | 60 | | | | | |
| | | (C)-1 | | 15 | 10 | | | 40 | 8 | | | 15 |
| | (D) | Elastomer (comparison) | | | | | | | | | 15 | |
| Evaluation | (1) | Moisture resistance holding rate (%) | 95 | 85 | 88 | 85 | 90 | 90 | 92 | 5 | 8 | 5 |
| | (2) | Izod impact strength (23° C.) (kJ/m$^2$) | 70 | 65 | 70 | 55 | 75 | 60 | 80 | 5 | 85 | 6 |
| | (3) | Falling weight impact strength (1 mm) (J), thin wall thickness | 16 | 12 | 20 | 10 | 10 | 14 | 18 | 7 | 2 | 8 |
| | (4) | Falling weight impact strength (2 mm) (J) | 35 | 28 | 30 | 24 | 20 | 30 | 36 | 25 | 18 | 10 |
| | (5) | Fluidity SFL (cm) | 25 | 42 | 32 | 70 | 24 | 65 | 22 | 45 | 30 | >100 |
| | (6) | Flame retardancy (1.5 mm) | NG | NG | V-2 | V-2 | NG | V-2 | V-2 | NG | NG | NG |

The components (A) to (C) shown in Table 1 are the following compounds.
(A)-1: bisphenol A polycarbonate (FN1700A, manufactured by Idemitsu Kosan Co., Ltd.) having a viscosity average molecular weight of 17,500
(A)-2: PC-PDMS (polycarbonate-polydimethylsiloxane copolymer) having a viscosity average molecular weight of 17,000 and a PDMS (polydimethylsiloxane) content of 4.0

INDUSTRIAL APPLICABILITY

The thermoplastic resin composition of the present invention is provided with a mechanical characteristic of polycarbonate and an excellent fluidity of polylactic acid in combination by adding the vinyl based graft copolymer to the resin composition comprising the polycarbonate resin and the polylactic acid based resin and makes it possible to obtain a molded article which has a hydrolysis resistance and which is improved in an impact resistance and a thin-walled falling weight impact strength.

A rise in the above characteristics makes it possible to use the plastic molded articles over a long period of time, and not only the thin-walled molding property and the portability are improved, but also the thermoplastic resin composition of the present invention can industrially advantageously be used as well for large-sized molded articles.

In the thermoplastic resin composition of the present invention, use of the polycarbonate-polyorganosiloxane copolymer as the polycarbonate resin composition makes it possible to improve as well the flame retardancy and advantageously use the thermoplastic resin composition of the present invention for office automation equipments, information and communication equipments, car parts, building components, home electric appliances and the like.

What is claimed is:

1. A thermoplastic resin composition comprising
100 mass parts of a polycarbonate resin composition comprising
50 to 95 mass % of (A) a polycarbonate resin,
50 to 5 mass % of (B) a polylactic acid based resin, and
5 to 65 mass parts of (C) a vinyl based graft copolymer,
wherein the vinyl based graft copolymer (C) comprises at least one copolymer selected from the group consisting of an acrylonitrile-butadiene-styrene copolymer (ABS resin), an acrylonitrile-acryl rubber-styrene copolymer (AAS resin), and an acrylonitrile-(ethylene.propylene.diene rubber)-styrene copolymer (AES resin).

2. The thermoplastic resin composition as described in claim 1, wherein the polycarbonate resin (A) has a viscosity average molecular weight of 14,000 to 40,000.

3. The thermoplastic resin composition as described in claim 1, wherein the polycarbonate resin (A) is a polycarbonate-polyorganosiloxane copolymer or a polycarbonate resin comprising a polycarbonate-polyorganosiloxane copolymer.

4. A molded article comprising the thermoplastic resin composition as described in claim 1.

5. The molded article as described in claim 4, wherein the molded article is selected from office automation equipment, information equipment, communication equipment, a car part, a building component and a home electric appliance.

6. The thermoplastic resin composition of claim 1, wherein the polycarbonate resin (A) comprises bisphenol A polycarbonate.

7. The thermoplastic resin composition of claim 1, wherein the vinyl based graft copolymer (C) comprises an acrylonitrile-butadiene-styrene copolymer.

8. The thermoplastic resin composition of claim 6, wherein the vinyl based graft copolymer (C) comprises an acrylonitrile-butadiene-styrene copolymer.

9. The thermoplastic resin composition of claim 1, wherein the polycarbonate resin (A) comprises a polycarbonate-polydimethylsiloxane copolymer.

10. The thermoplastic resin composition of claim 6, wherein the polycarbonate resin (A) further comprises a polycarbonate-polydimethylsiloxane copolymer.

11. The thermoplastic resin composition of claim 10, wherein the vinyl based graft copolymer (C) comprises an acrylonitrile-butadiene-styrene copolymer.

12. The thermoplastic resin composition of claim 9, wherein the polycarbonate resin (A) further comprises a polydimethylsiloxane.

13. The thermoplastic resin composition of claim 1, wherein the acrylonitrile-butadiene-styrene copolymer has a butadiene content of 5-30 mass %, the acrylonitrile-acryl rubber-styrene copolymer has an acryl rubber content of 5-30 mass %, and the acrylonitrile-(ethylene.propylene.diene rubber)-styrene copolymer has an a ethylene.propylene.diene rubber content of 5-30 mass %.

14. The thermoplastic resin composition of claim 13, wherein the vinyl based graft copolymer (C) comprises said acrylonitrile-butadiene-styrene copolymer.

15. The thermoplastic resin composition of claim 13, wherein the vinyl based graft copolymer (C) comprises said acrylonitrile-acryl rubber-styrene copolymer.

16. The thermoplastic resin composition of claim 13, wherein the vinyl based graft copolymer (C) comprises said acrylonitrile-(ethylene.propylene.diene rubber)-styrene copolymer.

* * * * *